US010043191B2

(12) United States Patent
Peretti (10) Patent No.: US 10,043,191 B2
(45) Date of Patent: Aug. 7, 2018

(54) SYSTEM AND METHOD FOR ONLINE PRODUCT PROMOTION

(75) Inventor: Jonah Holmes Peretti, New York, NY (US)

(73) Assignee: BuzzFeed, Inc., New York, NY (US)

( * ) Notice: Subject to any disclaimer, the term of this patent is extended or adjusted under 35 U.S.C. 154(b) by 2541 days.

(21) Appl. No.: 11/458,339

(22) Filed: Jul. 18, 2006

(65) Prior Publication Data

US 2008/0033781 A1 Feb. 7, 2008

(51) Int. Cl.
*G06Q 30/02* (2012.01)

(52) U.S. Cl.
CPC ........ *G06Q 30/02* (2013.01); *G06Q 30/0276* (2013.01)

(58) Field of Classification Search
CPC .................................. G06Q 30/0276
USPC .................. 705/14.4, 14.72, 14.73
See application file for complete search history.

(56) References Cited

U.S. PATENT DOCUMENTS

| 6,785,671 | B1 * | 8/2004 | Bailey et al. .................. 705/26 |
| 6,839,681 | B1 | 1/2005 | Hotz |
| 6,963,848 | B1 | 11/2005 | Brinkerhoff |
| 2001/0032126 | A1 * | 10/2001 | MacArtney-Filgate et al. ............................. 705/14 |
| 2004/0015397 | A1 * | 1/2004 | Barry .................... G06Q 30/02 705/14.55 |
| 2004/0059625 | A1 * | 3/2004 | Schrader ....................... 705/10 |
| 2004/0098229 | A1 * | 5/2004 | Error et al. .................... 702/186 |
| 2004/0172323 | A1 * | 9/2004 | Stamm ............................ 705/10 |
| 2004/0205065 | A1 | 10/2004 | Petras et al. |
| 2005/0034071 | A1 * | 2/2005 | Musgrove et al. ........... 715/530 |
| 2005/0091038 | A1 * | 4/2005 | Yi ....................... G06F 17/2715 704/10 |
| 2005/0216335 | A1 | 9/2005 | Fikes |
| 2006/0053156 | A1 | 3/2006 | Kaushansky |
| 2006/0106670 | A1 | 5/2006 | Cai |
| 2006/0143158 | A1 * | 6/2006 | Ruhl et al. ........................ 707/3 |
| 2007/0100688 | A1 * | 5/2007 | Book ..................... G06Q 30/02 705/14.52 |
| 2007/0112735 | A1 * | 5/2007 | Holloway et al. ................ 707/3 |

OTHER PUBLICATIONS

Epinions.com (http://web.archive.org/web/20050101085337/http://www.epinions.com/), 1999-2004.*
Home-Based-Business-Opportunities.com, How to Get Free PI Advertising on Radio (http://web.archive.org/web/20060616032209/http://www.home...-opportunities.com/c-marketing/pi-radio-advertising.shtml), Jun. 16, 2006.*

(Continued)

*Primary Examiner* — Nadja N Chong Cruz
(74) *Attorney, Agent, or Firm* — Fenwick & West LLP (57) ABSTRACT

The present invention provides a method and system for assembling feedback of at least one product of at least one client. The method aggregates feedback of at least one product from at least one commentary site and categorizes the aggregated feedback into one or more categories. Further, the method processes the categorized feedback and stores the processed feedback and at least one commentary site in a headline database. In an embodiment, headlines are provided that link to positive feedback. Thereafter, the headline links are published as an advertisement on at least one online source.

13 Claims, 10 Drawing Sheets

(56) References Cited

OTHER PUBLICATIONS

PR Newswire, Konica Minolta Receives 2005 Product Line of the Year Recognition from Buyer Laboratory, Jul. 7, 2005.*
David Frey, Using Customer Testimonials in Your Marketing Message to Break Down Fear and Skepticism, (http://web.archive.org/web/20050307140117/http://www.powerhomebiz.com/vol84/testimonials.htm) Mar. 7, 2005.*
Gaebler Ventures, for Entrepreneurs, Customer Testimonials Six Great Tips for Collecting Customer Testimonials (http://web.archive.org/web/20051213200533/http://www.gaebler.com/Customer-Testimonials.htm), Dec. 13, 2005.*
Langridge et al., Pingback 1.0, Specification, 2002.*
Morinaga et al., Mining Product Recommendations on the Web, SIGKDD 2002 Edmonton, Alberta, Canada.*
Dave et al., Mining the Peanut Gallery: Opinion Extraction and Semantic Classification of Product Reviews, WWW2003, May 20-24, Budapest, Hungary.*
Pang et al., Thumbs up? Sentiment Classification using Machine Learning Techniques. Proceeding of EMNLP 2002, pp. 79-86.*
http://www.marketingprofs.com/ea/qst_question.asp?qstid=6409 What Are the Benefits of Product Testimonials? Posted by Anonymous on Mar. 26, 2005.*
Geoff Ramsey, Ten Reasons Why Word-of-Mouth Marketing Works, Online Media Daily (Year: 2005).*
http://www.bzzagent.com/downloads/press/About_BzzAgent.pdf.
http://www.technorati.com/about/.

* cited by examiner

SYSTEM AND METHOD FOR ONLINE PRODUCT PROMOTION

FIELD OF THE INVENTION

The present invention relates to online promotion of products. More specifically, it relates to assembling and publishing word-of-mouth consumer feedback about a product for use in the promotion of the product.

BACKGROUND

The Internet has made it easier to obtain the latest information and to make better informed decisions when purchasing products and services. The Internet also acts as a powerful tool for advertising and marketing as it hosts websites and other types of interactive systems, for example, weblogs (blogs), personalized weblogs (plogs), community sites, chat services, message services, and Usenet groups. These interactive systems provide a platform on which consumers, advertisers, and other reviewers can post commentary, views, and recommendations related to various types of products. The products may include, for example, physical products, journal articles, movie and music titles, downloadable software, services, financial products, and the like.

As is common now, to advertise a product, on-line advertisements (ads) are displayed along with search results on various search engines (for example, as sponsored results on Google or Yahoo or as display ads on web sites). The advertisee, which may be a company selling its product or an advertising agency hired by the company to sell its products, pays a web site owner/publisher, or a search engine, to advertise the product as a static or dynamic ad, banner ad, text ads like Google Adsense sponsored links, and the like. Typically, an Internet user performs a search, for example on MP3 players, in a search engine such as Google or Yahoo or visits a web site and sees the ads displayed adjacent to editorial content. Results of the search or display ads include sponsored ads such as an ad for the Apple Ipod. The Internet user can then click on the sponsored ad to navigate to the advertiser's website and obtain more information and/or buy the product.

Product reviews provided by consumers, such as bloggers, are useful to both the entity whose product is being reviewed, and also for the millions of prospective consumers who may be interested in purchasing the product. Thus, the Internet can serve as a powerful medium for word-of-mouth behavior from a wide variety of consumers.

Many techniques well known in the art have attempted to make use of online reviews and commentary. For example, in accordance with one technique known in the art for advertising, a method of assimilating customer feedback is disclosed. In this method, word-of-mouth comments from satisfied customers are determined through a networked community. However, this well known technique does not disclose how the word-of-mouth comments are used for generating advertisements linking back to product reviews. Also, it does not disclose how word-of-mouth comments can serve as sponsored links, including headlines, highlighting the word-of-mouth comments.

In accordance with another technique known in the art, a blog search engine is disclosed wherein clients pay entities hosting the blog search engine to syndicate links to bloggers talking about a particular product. However, the blog search does not help the client determine what bloggers are discussing in relation to their product. Moreover, the blog search engine only displays the results, and does not provide a publishing system where the clients can write headlines that link to the blogs.

Further, the existing interactive systems and sources for posting or publishing comments have an inherent limitation in utilizing the available information; the information is not available and organized at a single website or in a single database. To address this problem, a technique known in the art is used for identifying the speaker attributes and semantic attributes associated with the captured data and for analyzing the processed information based on the data. However, this technique does not publish the classified information at a single website. Moreover, the technique does not use the classified information as an advertising platform or publishing system. It also fails to disclose any sort of headline/favorable user commentary-based method of advertising.

Due to the distributed nature of the Internet, and the lack of availability of collective information, merchants and manufacturers typically, lack sufficient information about consumer experiences corresponding to items sold by the merchants or made by the manufacturers. Thus, merchants and manufacturers are deprived of information that would allow them to provide better service and/or products. Furthermore, because merchants are deprived of sufficient consumer opinions and feedback on previously purchased items, they are handicapped in their ability to generate an accurate consumer profile that would allow the merchants to recommend future items for purchase by the consumer.

Therefore, there is a need to provide a one-stop-shop for feedback and commentary on products. Also, there is a need for systems and methods that will assist advertisers and marketers to market their products effectively. Further, there is a need to collect feedback from a number of online sources to guide potential purchasers to make informed decisions by reading unbiased and honest opinions from real consumers from a single source.

SUMMARY

A computer implemented method promotes a client's product. A server has one or more processors and memory storing one or more programs for execution by the one more processors. Feedback is aggregated for at least one product from at least one online commentary site. The aggregated feedback is categorized into one or more categories. The categorized feedback is processed. The processing includes providing at least one headline. The processed feedback, the at least one online commentary site, and the at least one headline is stored in a headline database.

DETAILED DESCRIPTION

Referring to some terms in the foregoing and following description, feedback comprises, without limitation, a consumer's opinion, comments, reviews, recommendations, and combinations thereof. In the foregoing and following description, a product includes, without limitation, a physical product, a journal article, a movie and/or a music title, downloadable software, a service, and other less tangible but still purchaseable articles such as financial products, including stock assets, a mortgages, loans, and the like. In the foregoing and following description, a commentary site includes an online source such as, but not limited to, a weblog, a blog site, a web site, a personalized weblog (plog), a community site, a portal, a search engine, a Usenet group, a message board, and electronic mail. The plog, for example, includes a personalized web log that appears on a customer's home page like a blog, and is sorted in a reverse chronological order. A client is an entity, such as company or merchant wishing to sell a product or promote a brand. A client may also comprise an entity such as an advertising or PR firm hired by a company or merchant to promote a product or brand.

The present invention provides, in various embodiments, methods and systems for assembling feedback of at least one product from at least one commentary site. The feedback, for example, includes positive word-of-mouth opinion from a blogger. The blogger may be, for example, an actual consumer of a product. In accordance with an embodiment, the feedback is aggregated, processed, and published on at least one online source. In another embodiment, the feedback is aggregated, categorized, processed and published on the online sources. The processing includes sorting and editing the aggregated feedback. Further, the editing includes providing headlines to the sorted feedback. In various embodiments, the published feedback may be used for advertising, marketing, and press release (PR) activities.

The present invention also establishes a social network for the promotion of the products. In one embodiment, favorable feedback of products are processed and converted into, for example, advertisements or press release pages. The favorable feedback is published on online sources. This drives traffic to positive word-of-mouth feedback web sites such as blogs, and enhances promotion of the product reviewed or discussed on the blogs. In various embodiments, the advertisements are published either as a promotional link or a sponsored link on websites, and/or served to search engines and other online sources. The favorable feedback comprises positive commentary or feedback about a product provided by a blogger. Positive feedback indicates appreciation of a product by a blogger, and includes the blogger's favorable opinions, comments, reviews, recommendations. Negative feedback may include the blogger's opinions, comments, and reviews discussing drawbacks, poor performance, and other negative aspects of a product.

Figure 1:
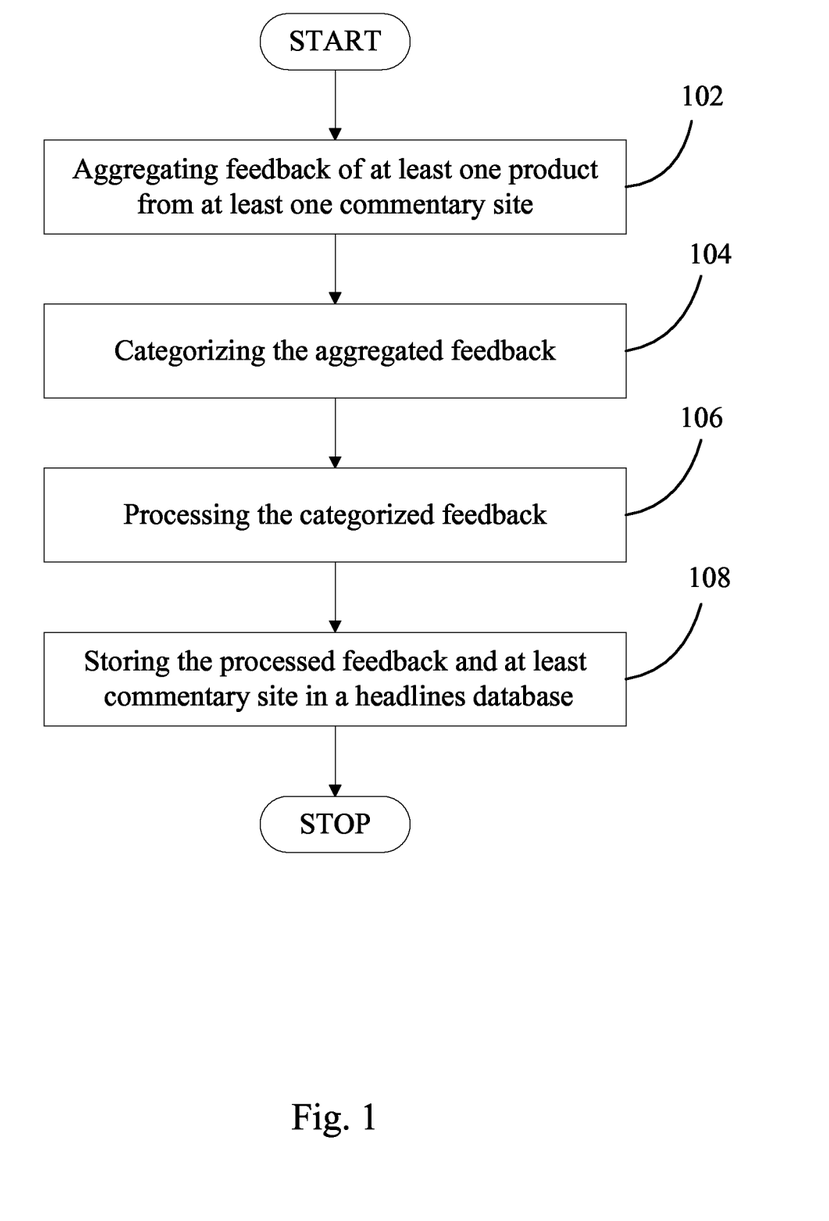
FIG. 1 illustrates a flowchart depicting various steps for assembling feedback of at least one product of at least one client from at least one commentary site, in accordance with an embodiment of the present invention.

FIG. 1 illustrates a flowchart depicting various steps for assembling feedback of at least one product of at least one client from at least one commentary site, in accordance with an embodiment of the present invention. For each product, the method involves aggregating feedback from at least one commentary site (step 102). The feedback comprises word-of-mouth commentary of a blogger about the product. The feedback is aggregated by manual submission, a web crawler, a bookmarklet, and combinations thereof.

A web crawler (also known as a web spider or web robot) is a program which browses the Internet in a methodical, automated manner to gather specific types of information from Web pages. Web crawlers are mainly used to create a copy of visited web pages for later processing by a search engine, which then indexes the visited pages. Web crawlers are well understood in the art.

A bookmarklet comprises code such as Java Script code that can be stored as part of the toolbar in most popular web browsers, or within hyperlinks on a web page. In accordance with an embodiment, code for one exemplary bookmarklet is as follows:

```
<html>
<head>
<title>headline database ad link</title>
<script>
    function sendForm(form) {
        //alert( "" + document.getElementById('headline').value + "");
        var campaigns = document.getElementById('campaigns');
        var rating = document.getElementById('rating');
        if(campaigns.selectedIndex == 0 || rating.selectedIndex == 0 || document.getElementById('headline').value == '') {
            alert('please select a campaign, a rating and
            enter a headline');
        } else {
            form.submit( );
        }
        return false;
    }
</script>
<script>
    function selectCamp(form) {
        var campaigns = document.getElementById('campaigns');
        if(campaigns.options.length == 2 ) {
            campaigns.selectedIndex = 1;
        }
    }
</script>
</head>
<body onload="window.focus( ); selectCamp( );">
<div>
<a href="javascript:dOc7rB3=document.location.toString( ); bftitle='';
if(document.getElementsByTagName('title')[0]) {
bftitle=document.getElementsByTagName('title')[0].innerHTML;} {var
mywin=window.open('http://headlinedbase.com:3000:3000/addlink?pop=
true&url=' + escape(dOc7rB3) + '&title=' + escape(bftitle), 'addlink',
'toolbar=no,menubar=no,width=400,height=400,resizable=yes,
scrollbar=true');
mywin.focus( ); }">
add link bookmarklet v0.2</a>
</div>
</body>
</html>
```

A web bug may also be implemented for aggregating feedback (step 102). The web bug is used to discover sources of potential feedback from potential commentary sites. The web bug comprises Java Script that a client adds to its web site for tracking referring links of visiting users so it is possible to determine how they found the client's web site. Web sites, such as blogs, corresponding to the referring link can then be scanned to determine if they comprise any positive commentary. Furthermore, the blog may be used as a starting point for the crawler to discover other potential commentary sites. Exemplary web bug code is as follows:

```
<script type="text/javascript" src="http://headlinedbase.com/
buzz.js?sid=8675310" id="buzzscript"></script>
```

```
The .js code in the src= is:
buzz( );
function buzz( ) {
    var script = document.getElementById("buzzscript");
    var qindex = script.src.indexOf('?') + 5;
    var SID = script.src.substring(qindex, script.src.length);
    var ref = document.referrer;
    var loc = document.location;
    var host = loc.hostname.toString( );
    if(host.match(/^www\./)) {
        host = host.replace(/^www\./, "");
    }
    var match = new RegExp(host);
    if( ref && ! ref.match(match) && ! ref.match(/google\.|yahoo\./) ) {
        var src = "http://headlinedbase.com/buzz?r=" + escape(ref) +
              '&sid=' + SID;
        var script = "<script type=\"text/javascript\" src=\"" + src +
              "\"><\/script>";
        document.write(script);
    }
}
```

Aggregating (102) may also include manual submission, that is, direct submission of a commentary site or post on a commentary site by a blogger, a client, or a staff member. The blogger comprises a consumer or a user, who provides a feedback, optionally along with a headline. A headline is a short phrase describing or promoting the feedback. This is akin to the headline of a newspaper article, the headline being chosen to both sum up the contents of the newspaper article and entice a reader to read the article.

The aforementioned client includes a company whose products are promoted through positive feedback published on at least one online source. Positive feedback comprises favorable written commentary of a product by a consumer or user, such as a blogger. The staff includes an individual involved in assembling feedback, including an editor who reviews and processes the aggregated feedback. Thus, in various embodiments, the recommendation of the commentary sites is facilitated via, without limitation, a bookmarklet, a web bug, a form (manual) submission, and crawling sites.

Referring back to FIG. 1, the aggregated feedback is categorized (step 104) into one or more categories. Examples of categories include a positive feedback category, a negative feedback category, and a neutral feedback category.

Next, the categorized feedback is processed (step 106). The processing includes editing the categorized feedback. Optionally, the categorized feedback is sorted before being edited. The editing includes providing a headline for the categorized feedback. The processed feedback is then stored in a headline database (step 108). Briefly, the headline database is a database comprising feedback for products or advertising campaigns and headlines for the feedback. The headline database will be discussed in greater detail below.

Figure 2:
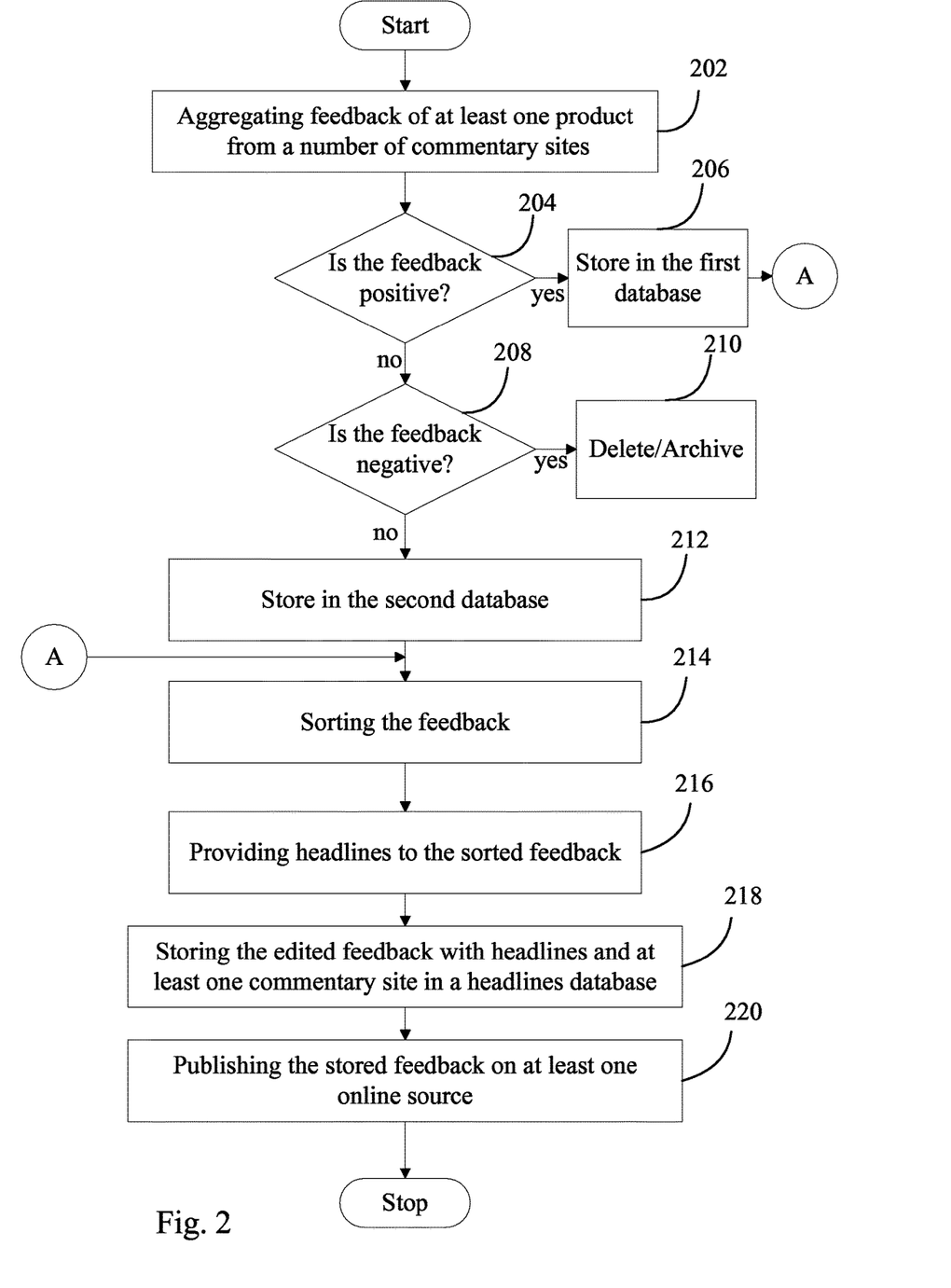
FIG. 2 illustrates a flowchart depicting a detailed representation of the steps for assembling feedback in accordance with another embodiment of the present invention.

FIG. 2 shows a flowchart depicting the steps for assembling feedback of at least one product in accordance with another embodiment of the present invention. At step 202, the feedback of a product is aggregated from a number of commentary sites as described with reference to FIG. 1. The aggregation (step 202) includes finding feedback about a product on the commentary sites and collecting the feedback from the commentary sites. For each aggregated feedback, a check is performed (step 204) to determine whether the aggregated feedback is positive or not positive. If the aggregated feedback is positive, the feedback is optionally stored in a first database (step 206). However, if the feedback is not positive another check is performed to determine the nature of the feedback (step 208). If the feedback is not positive, for example the feedback is neutral, it is either archived or deleted (step 210). Otherwise, the feedback is optionally stored in a second database (step 212). The first and second databases allow raw feedback to be stored based on its category (i.e. positive or negative) but before the feedback has been processed, edited, or in any way modified.

In an embodiment, the feedback may be determined as positive or negative on the basis of the semantic attributes of the feedback. Examples of positive semantic attributes include occurrence of the words "Good", "Fair", "Very Good", "Excellent", "recommended", "Highly recommended", and the like. Examples of negative semantic attributes include occurrence of the words "Not recommended", "Poor", "bad", and the like. The feedback may be determined as positive or not positive by the staff which may read the feedback and categorize it accordingly using human judgment. In an alternate embodiment, natural language processing may be employed to automatically categorize the feedback.

The categorized feedback is sorted (step 214) and headlines are provided to the sorted feedback (step 216). The client may sort the feedback. Sorting includes, in various embodiments, prioritizing the categorized feedback based upon the number of semantic attributes, products, geographical region, time-based, and the like.

At step 218, the edited feedback along with the headlines and the commentary sites are stored in the headline database. The edited feedback, including positive and optionally negative feedback, along with the headlines, can be indexed on the basis of a product or an advertising campaign. Further, as will be discussed, the client may log in to the headline database, and search for relevant content based on, but not limited to, a keyword search, and then sort the results of the search. This provides a platform to the client to search for all of the aggregated feedback of its products and then identify and promote the products using positive commentary from bloggers and other consumers. In various embodiments, the headlines may be written by a client, an editor, a staff, and/or a blogger.

Next, the stored feedback is published (step 220) on at least one online source. The publishing includes posting or serving the headlines optionally along with the feedback or a section of the feedback as an advertisement on any one of the online sources. For example, the advertisement may be in the form of a sponsored link or a promotional link. So, in one embodiment, the feedback aggregated from the commentary sites is converted into advertisements or public pages such as PR pages. These advertisement or public pages help drive Internet traffic to websites, such as blogs, providing the positive commentary. As already mentioned, the online source onto which the advertisement is published may be an advertiser's site, a client's site, a web site, a search engine, and the like.

According to another embodiment the links to positive commentary are published as a micro site which can be used for promotional purposes. The micro-site may be a public, freely accessible website. For example, the micro site can be a PR page, which comprises links and headlines, and may also contain, optionally, other content. Thus, the PR page provides a one-stop-shop for all of the positive feedback relevant to a product or advertising campaign, and provided, for example, by bloggers.

Figure 3:
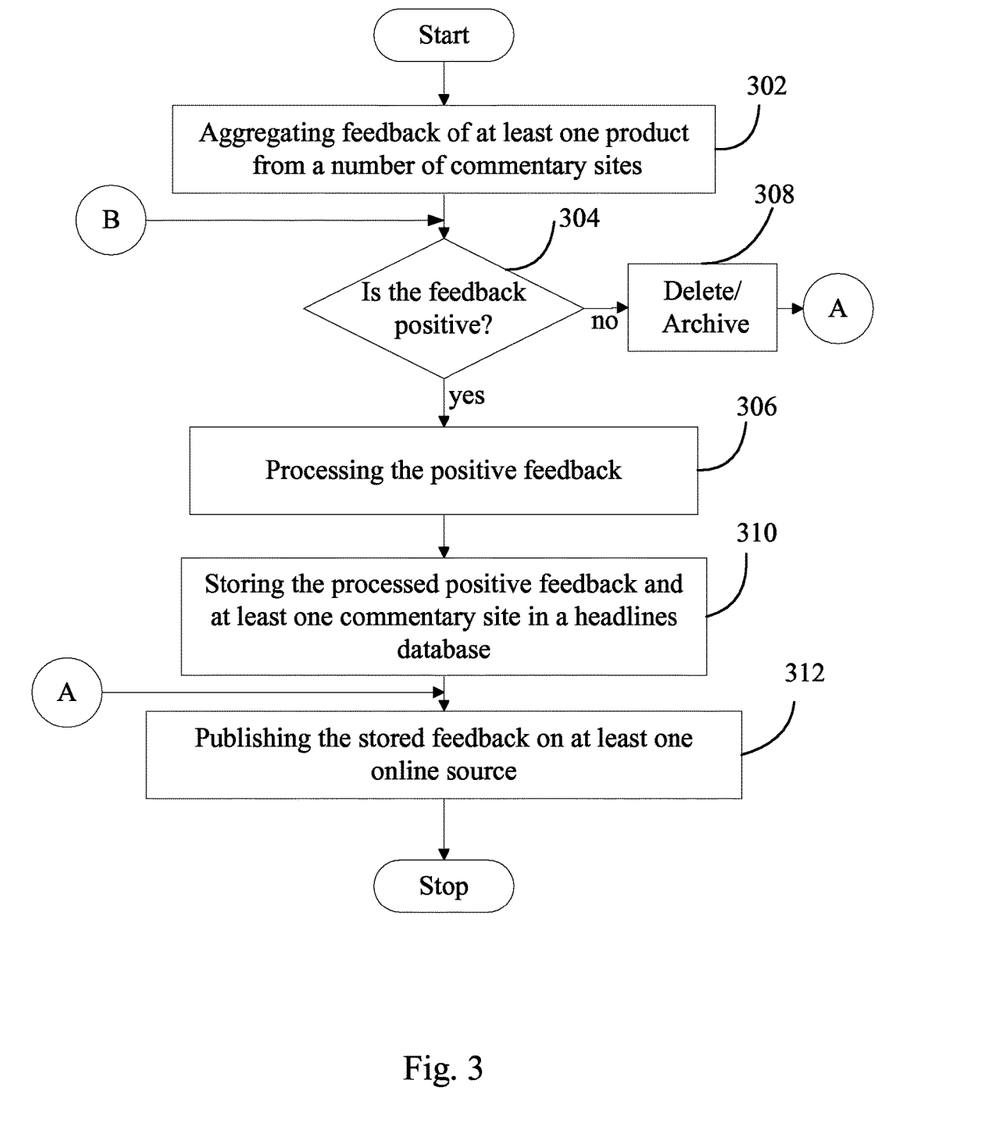
FIG. 3 illustrates a flowchart depicting the steps of promoting at least one product of at least one client in accordance with an embodiment of the present invention.

FIG. 3 illustrates a flowchart depicting the steps of promoting at least one product of at least one client in accordance with an embodiment of the present invention. At step 302, the feedback of a product is aggregated from a number of commentary sites as described with reference to FIG. 1. Once the feedback is aggregated, a check is performed (step 304) to determine whether the aggregated feedback is positive or not positive. As mentioned above, the determination may be made according to semantic attributes of the aggregated feedback. This may be performed either manually such as by a staff member, or automatically according to various well known natural language processing techniques. If the feedback is positive, it is marked as positive feedback and is processed (step 306). If it is not positive, it is either deleted or archived (step 308). As suggested above, feedback that is not positive is not necessarily negative. It may be negative, or, it may not be appropriate for the instant advertising campaign or product, but may be of interest for a future advertising campaign.

The processing (step 306) of the positive feedback includes providing a headline for the positive feedback. It also optionally includes sorting the positive feedback. In accordance with various embodiments, a staff, a client, or a blogger may provide the headlines to the positive feedback.

The processed feedback is stored (step 310) in the headline database along with the commentary sites. By "storing the commentary sites", it is understood to include storing symbolic links such as URIs (Universal Resource Identifiers) or URLs (Universal Resource Locators) to the commentary sites. The headline database stores the processed feedback along with the commentary sites in an indexed manner. By "indexed manner" it is meant that feedback is linked with their corresponding products and commentary sites and indexed according to, for example, alphabetical order, product names, advertising campaign, or any other criteria that is useful for advertisers.

The stored positive feedback is then published (step 312) on at least one online source. According to the various embodiments, the publishing includes posting or serving the headlines, along with the feedback, as an advertisement on the online sources, for example, web sites, a sponsored advertisement on a search engine, a press release (PR) page, a client product page, a syndicated feed such as an RSS feed, and the like.

In one embodiment, the present invention also provides an interface to the client to create an advertising campaign using the positive feedback. Further, it provides an interactive interface to the client to monitor the positive feedback and the advertising campaign. These interfaces will be disclosed in detail below.

While the above discloses methods to aggregate positive feedback for a product, provide headlines to the positive feedback, and create and publish the positive feedback as a sponsored link on a search engine or another online source, a client or advertiser might also find it insightful to collect negative feedback on a product. This allows the client improve their product. A client may also find it useful to collect negative feedback on a competitor's product. This allows them to create "negative" advertisements pointing out the deficiencies in the competitor's product, and the superiority of their product.

Figure 4:
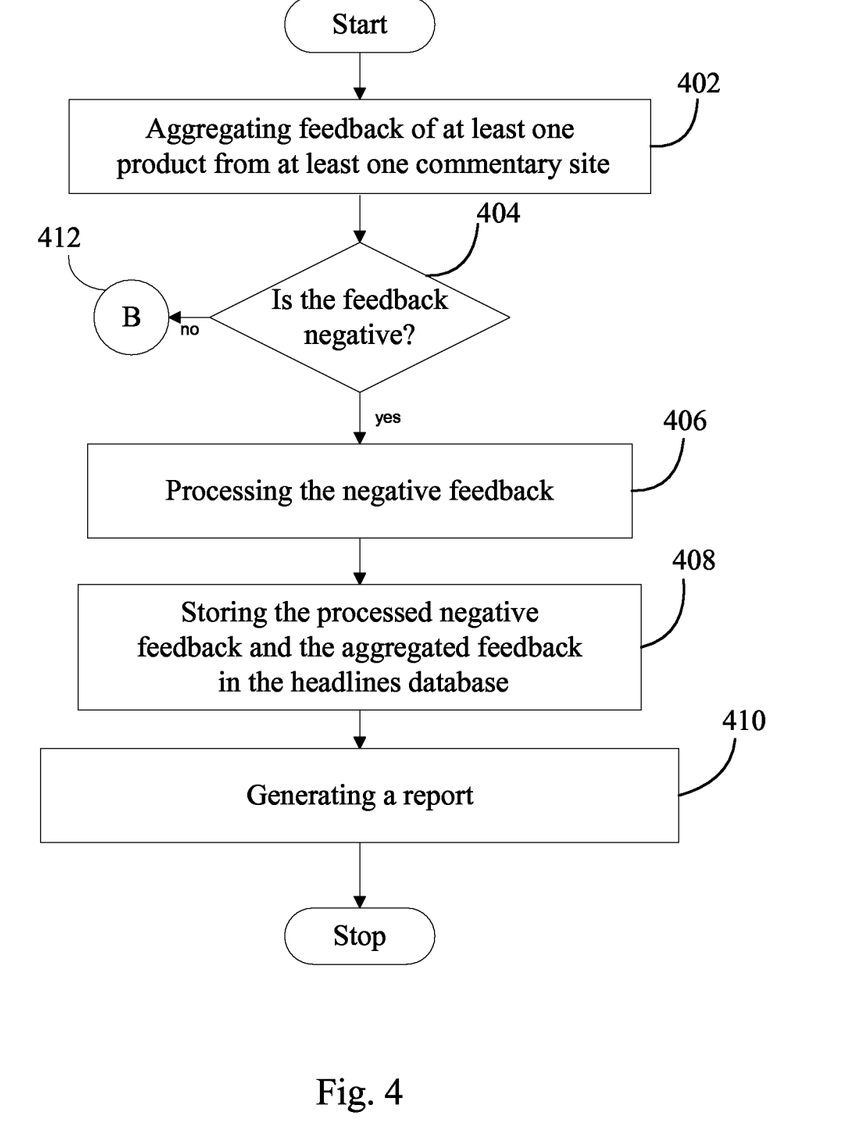
FIG. 4 illustrates a flowchart depicting the steps of collecting feedback for improvement of at least one product of at least one client, in accordance with an embodiment of the present invention.

To this end, FIG. 4 illustrates a flowchart depicting the steps of collecting feedback for the improvement of at least one product of at least one client in accordance with an embodiment of the present invention.

At step 402, the feedback of the product is aggregated from a number of commentary sites. The aggregated feedback is then checked (step 404) to find the negative feedback. If the feedback is negative, it is marked as negative feedback and then optionally processed (step 406). If it is not negative feedback, the feedback can optionally be checked to determine if it is positive feedback (optional step 412) and dealt with accordingly as disclosed above with reference to FIGS. 1-3.

During processing (step 406), the negative feedback is optionally sorted and edited. The processed feedback is stored in the headline database (step 408) along with the commentary sites. The storing includes archiving or deleting the processed negative feedback and the aggregated feedback.

Further, in an embodiment of the present invention, a report is generated (step 410) from the stored negative feedback. This report is useful to the client for improving their products, that is, by knowing why consumers dislike their product, they can improve upon it.

Figure 5:
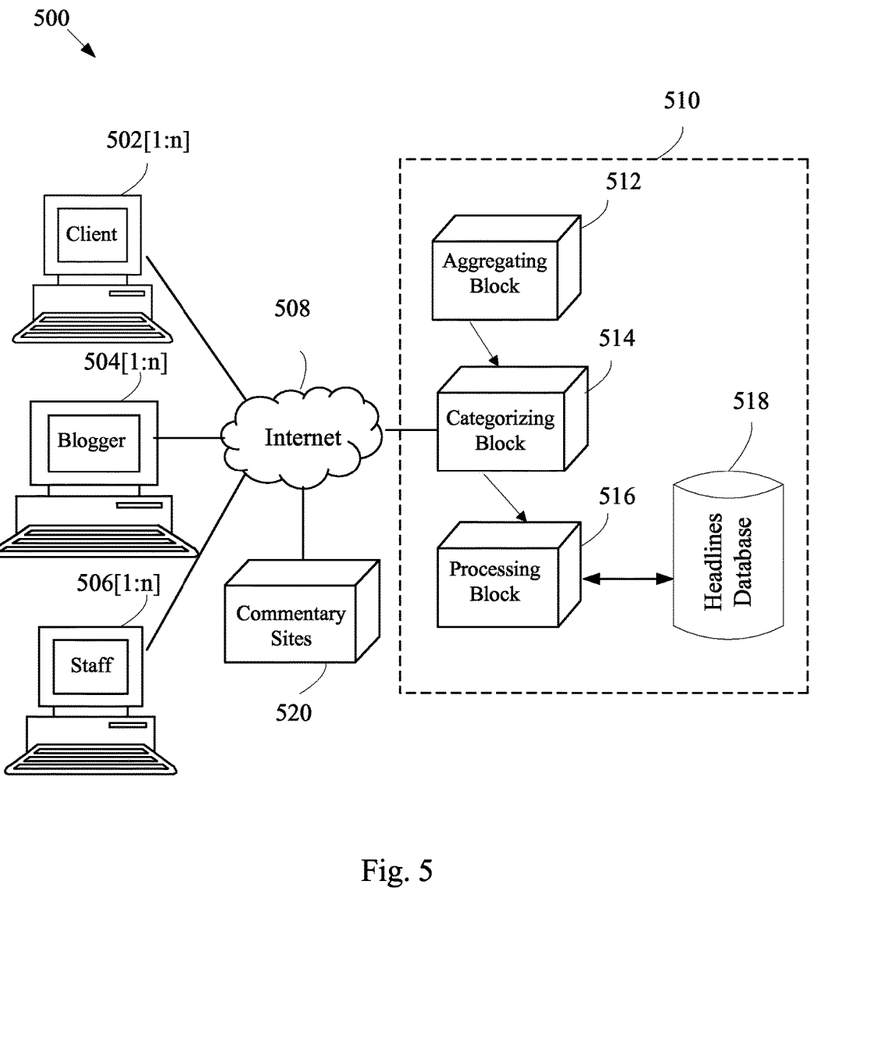
FIG. 5 is an illustration of a system in accordance with an embodiment of the present invention.

FIG. 5 is an illustration of a system 500 in accordance with an embodiment of the present invention. FIG. 5 illustrates a system comprising at least one client 502, at least one blogger 504, at least one staff 506, Internet 508, and a server 510. In one embodiment, server 510 comprises an aggregating block 512, a categorizing block 514, a processing block 516, and a headline database 518. The client 502, blogger 504, and staff 506 interact with server 510 through Internet 508. In one embodiment, server 510 is located at a client site. In another embodiment, server 510 is located at the site of a company providing the disclosed headline database methods and systems. Server 510, however, may be located anywhere as long as it is connected to Internet 508.

Internet 508 provides access to commentary sites 520 on which bloggers post comments or feedback related to products. According to various embodiments, a commentary site includes an online source, such as, but not limited to, a weblog, a blog site, a web site, a personalized weblog (plog), a community site, a portal, a Usenet group, a message board, and an electronic mail. According to an embodiment of the present invention, client 502 may include a company that wishes to promote its product or brand. Client 502 may also include a PR firm or an advertising agency employed by a company to promote the company's products or brands.

Aggregating block 512 aggregates feedback of at least one product of the client 502 from commentary sites 520. According to various embodiments, the aggregation is performed by manual submissions, a web crawler, a bookmarklet, and combinations thereof.

The aggregated feedback is then transferred to categorizing block 514 which categorizes the aggregated feedback into one or more categories. The categories, for example, include at least a positive feedback category, and may also include a negative feedback category and a neutral feedback category.

Processing block 516 processes the categorized feedback which includes editing the feedback. The feedback may optionally be sorted before being edited. Thereafter, headlines are provided to the sorted feedback. According to various embodiments, the headlines are provided by the client, a staff member, or a blogger. The processed feedback is stored in headline database 518. Further, headline database 518 also stores at least one commentary site.

According to one embodiment, headline database 518 is a progressive data repository that is continuously updated with feedback related to the product and aggregated from the commentary sites. The headlines in headline database 518 are used to advertise word-of-mouth opinions from actual consumers (such as bloggers) on various online sources. The publishing, according to various embodiments of the present invention, can be a sponsored advertisement on a search engine, a press release page, a client product page, and a syndicate feed. The online sources include an advertiser's site, a client site, a website, a search engine and combinations thereof.

In an embodiment, blogger 504 and/or staff 506 provide headlines to aggregated feedback. The blogger 504 may also submit feedback, and optionally submit headlines to server 510. The bloggers' headline and feedback is accepted after being reviewed by the staff member or by the client. Additionally, blogger 504 and/or staff 506 may aggregate at least one feedback from commentary sites 520 and provide headlines to the aggregated feedback. Thus, the present invention empowers an individual (for example, consumer, advertiser staff, and the like) not only to provide feedback, but also to aggregate other feedback deemed relevant, and to submit the aggregated feedback, optionally with headlines, to the headline database 518 of server 510.

Figure 6:
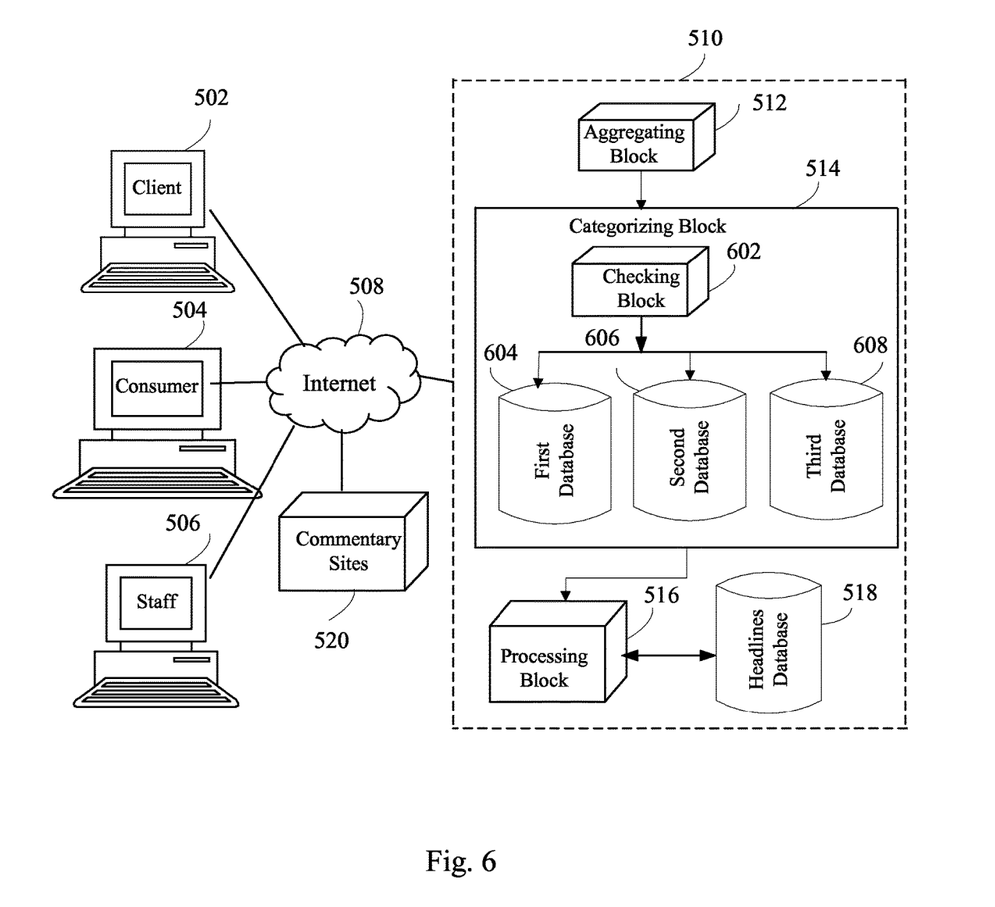
FIG. 6 is a schematic view of a system in accordance with another embodiment of the present invention.

FIG. 6 is a schematic view of a system in accordance with another embodiment of the present invention. The system comprises at least one client 502, at least one consumer 504 (such as a blogger), at least one staff 506, Internet 508, and server 510. According to one embodiment, server 510 comprises aggregating block 512, categorizing block 514, processing block 516, and headline database 518. The categorizing block further comprises a checking block 602, a first database 604, a second database 606, and a third database 608.

The three databases (604, 606, and 608) store feedback in having three different categories, but not yet processed, provided a headline, or stored in the headline database. There may be a greater or fewer number of these databases. In one example, first database 604 stores positive feedback, second database 606 stores negative feedback, and third database 608 stores feedback that is neither positive nor negative. Although the databases are illustrated as physically distinct items, it is understood that a single master database may store all of the databases while keeping the databases logically separate.

Aggregating block 512 aggregates the feedback of at least one product of client 502 from commentary sites 520. Checking block 602 checks the aggregated feedback to determine the nature of the aggregated feedback. The check may be performed based on the semantic attributes of the aggregated feedback. If the aggregated feedback is positive, the feedback is stored in first database 604. If the aggregated feedback is negative, it is stored in second database 606. Otherwise, the aggregated feedback is stored in third database 608. The feedback stored in third database 608 may be a neutral feedback. Processing block 516 processes the feedback stored in first database 604 and second database 606. The processing includes optionally sorting the feedback and adding headlines to the feedback. The processed feedback is stored in headline database 518, along with the commentary sites.

Figure 7:
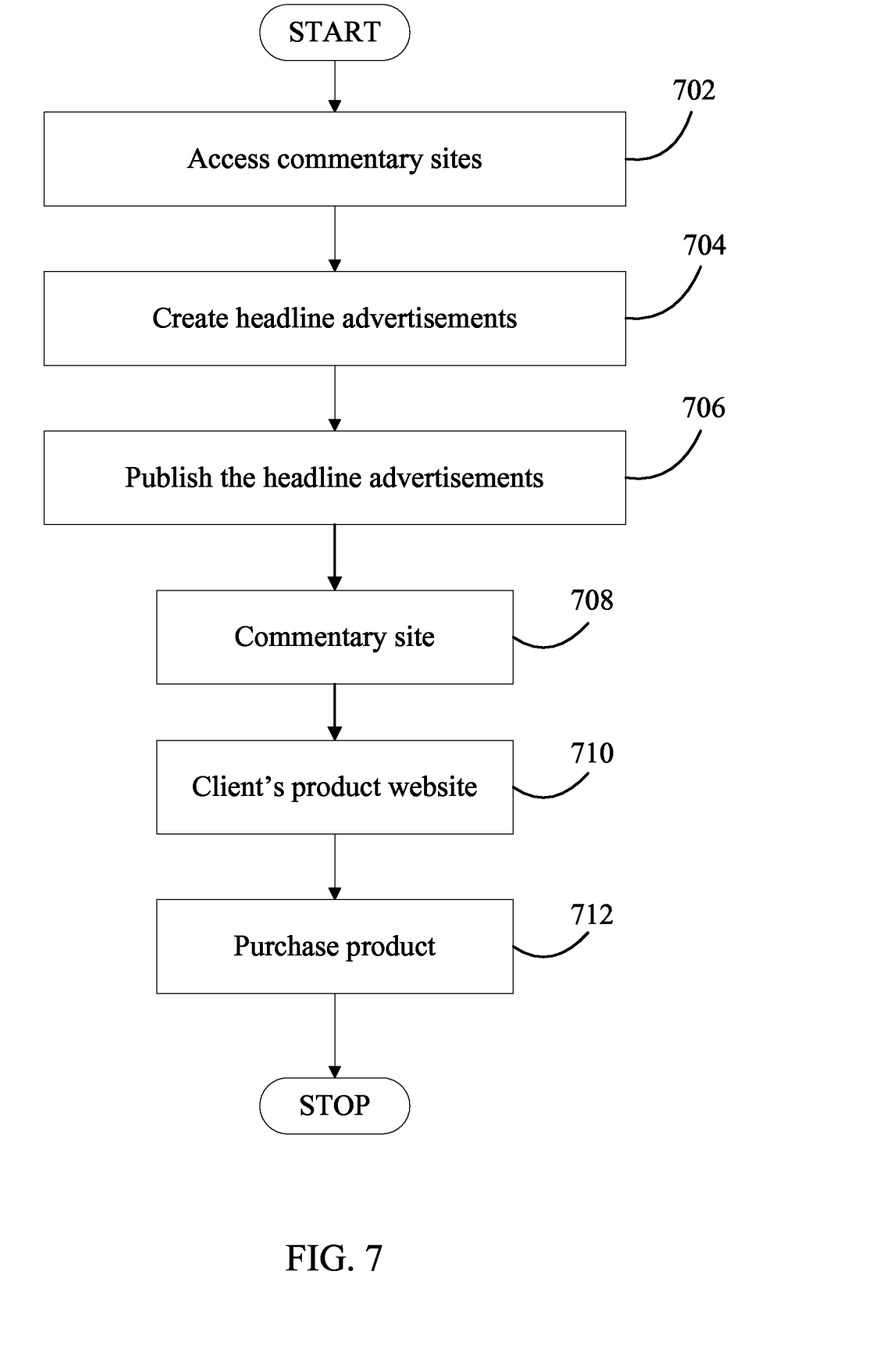
FIG. 7 shows an advertising method for a product in accordance with an embodiment of the present invention.

FIG. 7 shows an exemplary advertising method for a product using feedback from actual consumers of the product. The advertising method is enabled by the above disclosed methods and systems. A client or advertiser that is hired by the client to promote its products obtains positive feedback from commentary sites 702 and processes the positive feedback to create a headline advertisement 704. The headline advertisements are based on authentic editorial written by real consumers. The headline advertisement is published on an online source 706, for example as a sponsored result on a search engine or display ad on a content site. Internet users who click on the headline advertisement are guided to the commentary site 708 (for example, the blog) containing the authentic editorial. The positive and authentic review then draws the Internet user to the client's product website 710, which then increases the likelihood of the Internet user of forming a favorable opinion of the product that results in purchasing the product 712. Thus, the advertisements contribute to increased sales of the product, and have the benefit of driving traffic to the commentary sites such as blogs that write favorable commentary. In one embodiment, the advertisements are paid for by the clients.

Figure 8:
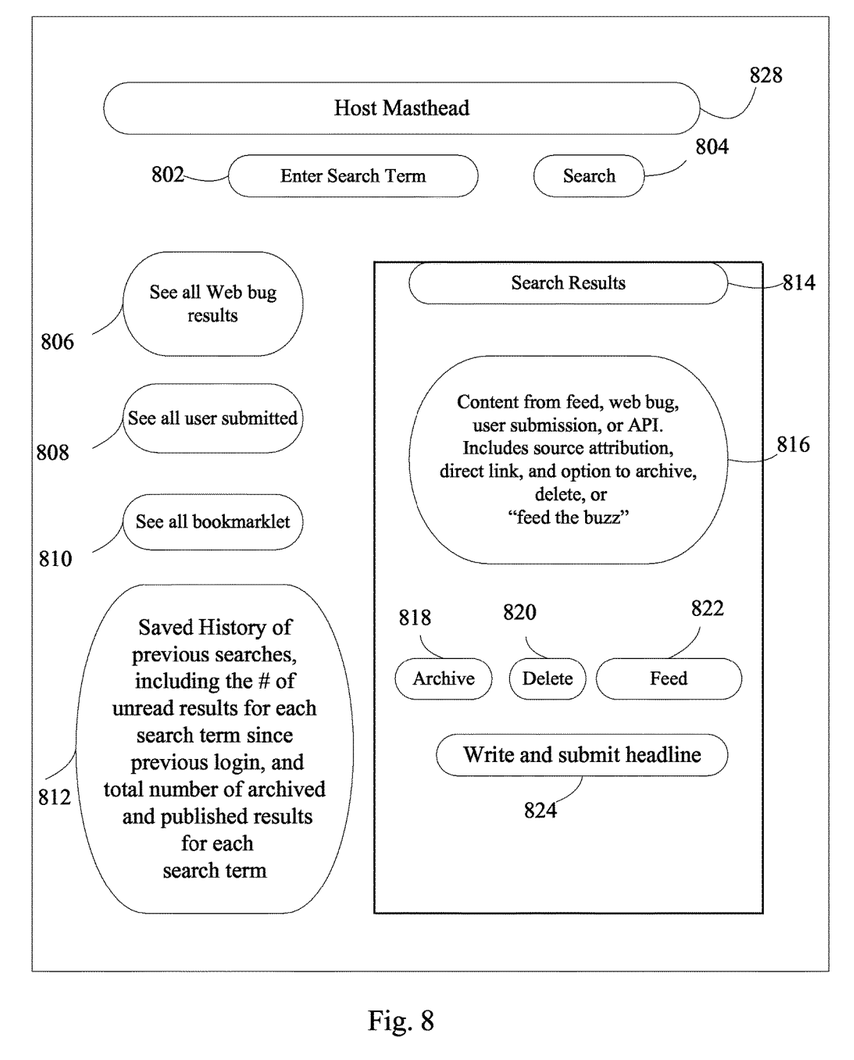
FIG. 8 illustrates an exemplary user interface for searching a headline database and creating headlines.

FIG. 8 illustrates an exemplary user interface used by a client, advertiser, or staff member for searching the headline database, monitoring and storing feedback, and creating headlines in accordance with the above disclosed methods and systems. The user enters a search term in block 802 to search for feedback related to a product or advertising campaign. On clicking block 804, a search of the headline database is commenced. Various search options are available. For example the user may view feedback submitted found from the web bug by clicking button 806, user submitted feedback by clicking button 808, and bookmarklet submitted feedback by clicking button 810. Previous searches and histories may also be viewed by clicking button 812. Search results are displayed in block 814 and 816. The user may archive the search results by clicking button 818. Alternatively, the user may delete the search results by clicking button 820, or feed the displayed search results by clicking button 822. When the user selects the feature Feed 822, text field 824 gets activated, which enables the user to write a headline for the search result.

According to various embodiments, the user can be a consumer, a blogger, a client, or a staff. In another embodiment, when the user is a consumer, the features 818 to 824 may be disabled, and other features may be handicapped. In an embodiment, clients pay a monthly fee to gain access to the headline database and associated features. The monthly fee may also permit the clients to create public PR web pages or paid advertisements for aggregating positive feedback links corresponding to their products.

Figure 9:
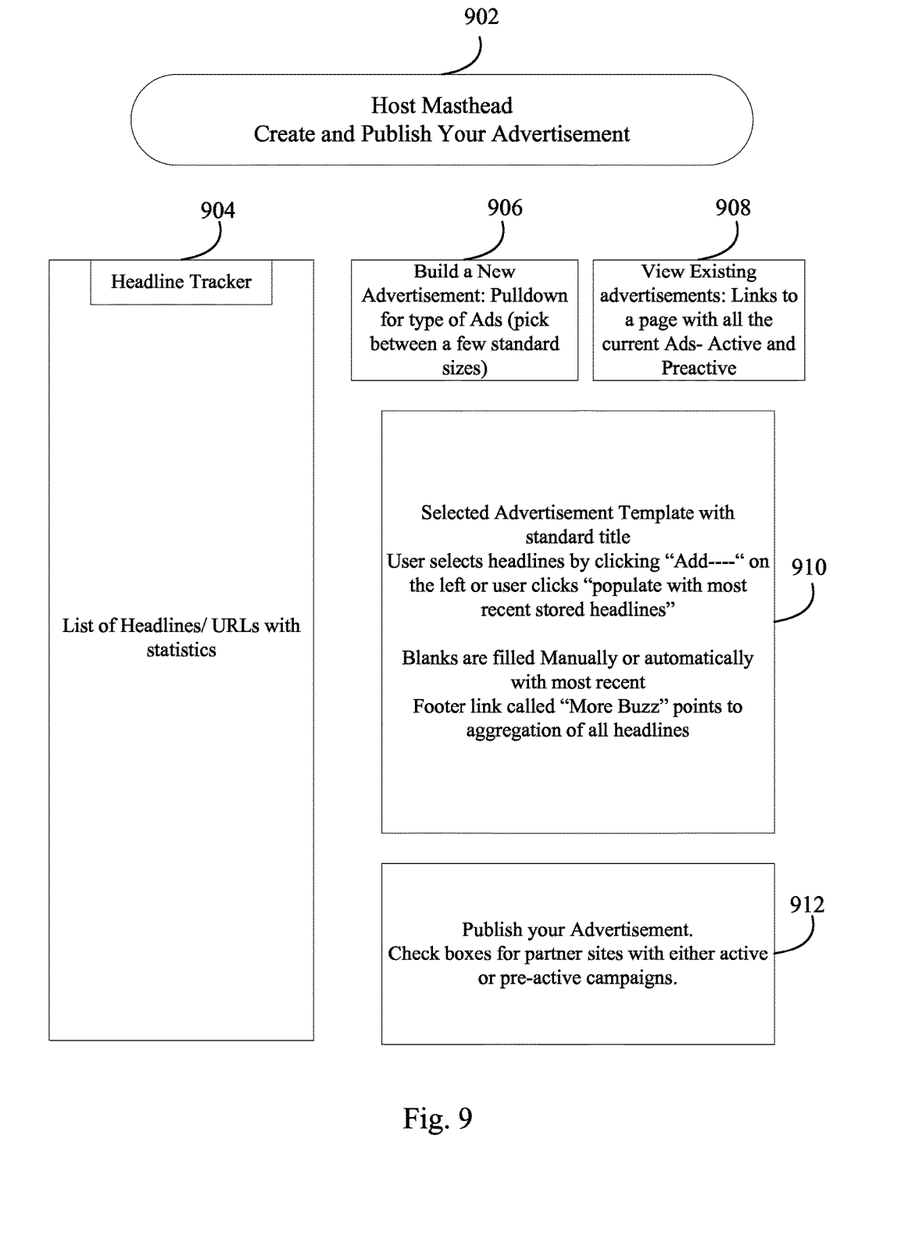
FIG. 9 illustrates an exemplary user interface used for creating and publishing advertisements.

FIG. 9 illustrates an exemplary user interface used for creating and publishing advertisements in accordance with the methods and systems disclosed above. This figure provides an exemplary implementation of a platform for creating advertising campaigns. The figure illustrates headline tracker 904 which is used to track a list of headlines and/or URLs, with statistics. The statistics may include information on the number of times the URL is viewed and/or clicked.

A new advertisement may be created by the user at block 906, where options for selecting different standard sizes are available. The options can be, for example, in the form of drop down menu, buttons, check boxes, and the like. If the user wishes to view existing advertisements, he may click button 908 where links to pages with all current advertisements, active, and pre-active can be viewed. The active advertisement refers to those advertisements which are currently displayed, and pre-active includes all those advertisements which are archived.

Block 910 provides an interface wherein selected advertisement templates appears with a standard title. The user selects headlines from block 904, and can add them to block 910 by clicking on the "Add" button. Or, the user can integrate these with the existing headlines stored in the database. The text for the new advertisement is added manually in the block 910. Also, at the footer, a link is provided, referred to as "More Buzz" which directs the user to a location where all of the aggregated feedback related to a product is stored.

Block 912 allows the user to publish the advertisement. This feature enables the user to select, for example, a partner site with whom the user wishes to publish the advertisement. The partner site may be an advertising agency, a complementary website, blog, or other site.

Many forms of payment are available to clients for access and use of the disclosed systems and methods. Clients may pay a CPM (Cost per 1000 impressions) rate to display paid advertising on partner sites and server headline ads to online sources. This model is similar to a standard rich media advertisement unit: the publisher displaying the advertisements can charge the client, and the advertiser can take a percentage share from the publisher. The present invention is compatible with all conventional on-line advertisement payment models. Clients may also pay a flat rate to have access and use of the disclosed systems and methods, even if they do not purchase advertising units.

As suggested several times above, the present invention rewards bloggers who write positive feedback on a product. Such bloggers are rewarded with increased traffic to their blog. The increased traffic leads to increased recognition among their peers and the blogging community. In the blogging community the success of a blog and the status of a blogger is largely measured by how many Internet users read the blog. Thus, the present invention provides a means by which bloggers can improve their standing and reputation in the blogging world.

Figure 10:
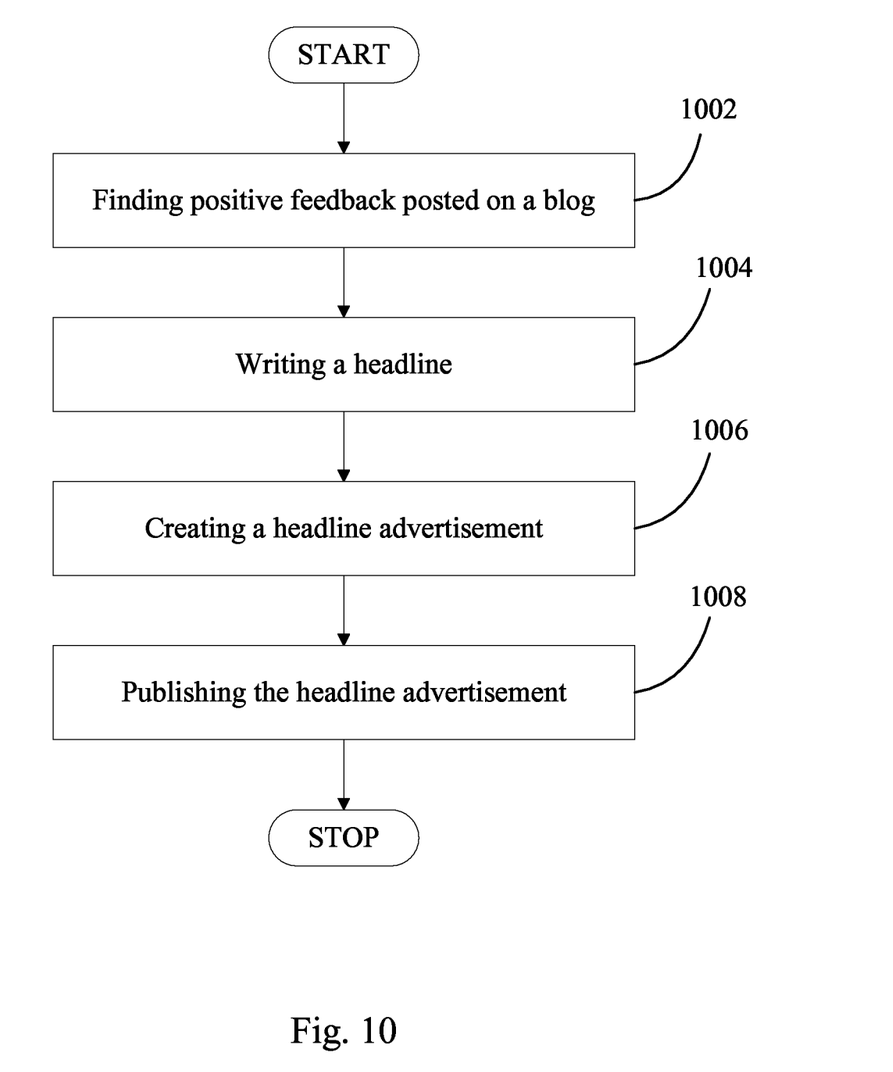
FIG. 10 shows a method for rewarding bloggers who write positive feedback on a product.

FIG. 10 shows a method for rewarding a blogger who writes positive feedback on a product. Positive feedback provided by a blogger and published on the blogger's blog is found (step 1002). In accordance with the above embodiments, a headline is written (step 1004). Next a headline advertisement is created (step 1006). In accordance with the above disclosure, the headline advertisement comprises the headline linked to the positive feedback. Then, the headline advertisement is published (step 1008) on an online source. Thus, any Internet user viewing the online source, who clicks on the online source, will be navigated to the bloggers blog, thereby increasing traffic to the blogger's blog.

Embodiments in addition to those disclosed are possible. For example, in one embodiment the positive commentary is ranked according to any number of variables and that rank is stored in the headline database. For example, a score may be assigned to the each positive commentary depending on how often a headline is clicked, or by the source of the commentary. The score may be used for displaying or sorting all or some of the headlines and positive commentary in rank order in the user interface. It may also be used for ordering, displaying, or sorting all of some of the headlines and positive commentary in rank order on a PR page or any other page. The score may also be used to automatically change attributes of the headline or advertisement being published, for example by modifying the type, size, or weight of the text or other elements of the headline advertisement.

In one more embodiment, a public landing page is published displaying headline ads for one or more product or brand. The public landing page differs from a PR page in that the public landing page is not necessarily paid for. It is a continuously and dynamically updated web page displaying links in the form of headlines to the latest reviews on products or brands.

Finally, the disclosed systems and methods, and modification thereof may be implemented on any conventional computer using any array of widely available and well understood software platforms, programs, and programming languages. For example, in one embodiment, the systems and methods are implemented on an Intel or Intel compatible based computer running a version of the Linux operation system. The databases are MySQL databases. Various computer and scripting languages are used such as PHP, Python, Perl, Java, Javascript, HTML, XML, and the like.

In the foregoing description, specific embodiments of the present invention have been described by way of examples with reference to the accompanying figures and drawings. One of ordinary skill in the art will appreciate that various modifications and changes may be made to the embodiments without departing from the scope of the present invention as set forth in the claims below. Accordingly, the specification and figures are to be regarded in an illustrative rather than a restrictive sense, and all such modifications are intended to be included within the scope of the present invention.

The foregoing detailed description has set forth a few of the many forms that this invention can take. It is intended that the foregoing detailed description be understood as an illustration of selected forms that the invention can take and not as a limitation to the definition of the invention. It is only the following claims, including all equivalents that are intended to define the scope of this invention.

What is claimed is:

1. A computer implemented method for publishing information about a product, the method comprising:
   at a server having one or more processors and memory storing one or more programs for execution by the one or more processors,
   aggregating items of feedback, via said server, about a product from a plurality of commentary sites;
   for each item of feedback:
      automatically determining using natural language processing whether the feedback item is positive or negative;
      responsive to a determination that the feedback item is negative, automatically augmenting a paid negative advertisement about the product to include a link to one of the plurality of commentary sites from which the feedback item was aggregated, the link to the feedback item distinct from the paid negative advertisement;
   and
   publishing, via the Internet to at least one online site that is not hosted by said server, the paid negative advertisement about the product, the paid negative advertisement including a plurality of items of negative feedback and a plurality of links to the plurality of commentary sites from which the plurality of items of negative feedback were aggregated.

2. The method of claim 1 wherein said aggregating comprises at least one of the following: submitting manually, web crawling, bookmarkleting, web bug referring.

3. The method of claim 1 further comprising indexing the plurality of commentary sites according to an advertising campaign.

4. The method of claim 1 wherein the feedback comprises a blogger's commentary, a blogger's reviews, and a blogger's recommendations.

5. A method for advertising at least one product of at least one client to at least one online site, the method comprising:
aggregating items of feedback, via a server, about a product from a plurality of commentary sites;
for each item of feedback:
automatically determining using natural language processing whether the feedback item is positive or negative;
responsive to a determination that the feedback item is positive, automatically augmenting a paid advertisement for the product to include a link to one of the plurality of commentary sites from which the feedback item was aggregated, the link to the feedback item distinct from the paid advertisement; and
publishing the paid advertisement for the product, the paid advertisement including a plurality of items of positive feedback and a plurality of links to the plurality of commentary sites from which the plurality of items of positive feedback were aggregated.

6. The method of claim 5 wherein said aggregating comprises at least one of the following: submitting manually, web crawling, bookmarkleting, web bug referring.

7. The method of claim 5 wherein augmenting the paid advertisement for the product includes providing a headline associated with the feedback item in the augmented paid advertisement.

8. The method of claim 5 wherein said publishing includes publishing the positive feedback as at least one of a sponsored link and a promotional link.

9. The method of claim 5, further comprising providing an interface to a client to create at least one advertising campaign using the positive feedback item.

10. The method of claim 5, further comprising providing an interface to a client to monitor the positive feedback item and an advertising campaign.

11. The method of claim 5, further comprising publishing a press release page including a selection of the positive feedback item present in a headline database for an advertising campaign.

12. The method of claim 5, wherein the augmented paid advertisement is published as at least one of a paid advertisement on a website, a paid advertisement on a search engine, a press release page, a client product page, or a syndicated feed.

13. A computer program product for advertising a product, the computer program product stored on a non-transitory computer-readable medium and including instructions configured to cause a computer to carry out steps comprising:
aggregating items of feedback, via a server, about a product from a plurality of commentary sites;
for each item of feedback:
automatically determining using natural language processing whether the feedback item is positive or negative;
responsive to a determination that the feedback item is positive, automatically augmenting a paid advertisement for the product to include a link to one of the plurality of commentary sites from which the feedback item was aggregated, the link to the feedback item distinct from the paid advertisement; and
publishing the paid advertisement for the product, the paid advertisement including a plurality of items of positive feedback and a plurality of links to the plurality of commentary sites from which the plurality of items of positive feedback were aggregated.

* * * * *